United States Patent

Deitz, Sr. et al.

[11] Patent Number: 5,956,445
[45] Date of Patent: *Sep. 21, 1999

[54] PLENUM RATED CABLES AND SHIELDING TAPE

[75] Inventors: Gregory J. Deitz, Sr., Richmond, Ind.; Timothy N. Berelsman, Delphos, Ohio

[73] Assignee: Belden Wire & Cable Company, Richmond, Ind.

[*] Notice: This patent is subject to a terminal disclaimer.

[21] Appl. No.: 08/891,373

[22] Filed: Jul. 11, 1997

Related U.S. Application Data

[63] Continuation-in-part of application No. 08/246,515, May 20, 1994, Pat. No. 5,666,452.

[51] Int. Cl.$^6$ .................................................. G02B 6/44
[52] U.S. Cl. ...................... 385/100; 385/106; 385/101; 174/24
[58] Field of Search .................................. 385/100–114; 174/24, 27, 35 R

[56] References Cited

U.S. PATENT DOCUMENTS

| | | |
|---|---|---|
| 3,883,218 | 5/1975 | Slaughter . |
| 4,158,478 | 6/1979 | D'Auria et al. . |
| 4,272,155 | 6/1981 | Slaughter ........................ 385/101 X |
| 4,443,657 | 4/1984 | Hill et al. . |
| 4,653,851 | 3/1987 | Pederson et al. . |
| 4,741,594 | 5/1988 | Suzuki . |
| 5,002,359 | 3/1991 | Sayegh . |
| 5,138,684 | 8/1992 | Bullock et al. . |
| 5,189,721 | 2/1993 | Sayegh et al. . |
| 5,237,635 | 8/1993 | Lai ........................................ 385/101 |
| 5,666,452 | 9/1997 | Deitz, Sr. et al. ...................... 385/100 |

*Primary Examiner*—Phan Palmer
*Attorney, Agent, or Firm*—Robert F. I. Conte; Lee, Mann, Smith, McWilliams, Sweeney & Ohlson

[57] ABSTRACT

A plenum rated cable having a core that includes a transmission medium of a plurality of insulated conductors preferably having thereon an insulating layer of a fluorinated ethylene composition. A shield surrounds the insulated conductors and extends longitudinally within and parallel to the length of the cable and includes a first layer of aluminum material and a second layer of low temperature smoke resistant cellulose acetate or polypropylene. The first and second layers are bonded together. A drain wire drains leakage within the cable generated from the current and allows for easy termination of the shield to a connector. A thermoplastic jacket encloses the drain wire and longitudinally surrounds the shield. The jacket is made preferably of a polyvinyl chloride composition.

34 Claims, 2 Drawing Sheets

PLENUM RATED CABLES AND SHIELDING TAPE

This is a continuation-in-part of our application Ser. No. 08/246,515 filed May 20,1994 now U.S. Pat. No. 5,666,452.

FIELD OF THE INVENTION

This invention relates to low temperature smoke resistant cellulose or polypropylene backed shielding tape for plenum rated cables that will pass the UL-910 flame test and the UL-1685 smoke test and for cable applications requiring limited smoke designs.

BACKGROUND OF THE INVENTION

Polyester backed shielding tapes are widely used in plenum rated products, such as plenum rated cables. Typically, these polyester backed shielding tapes are used in conjunction with a low cost plenum polyvinyl chloride compound. However, an undesirable synergistic effect often occurs between the polyester in the shielding tape and the polyvinyl chloride compound. As a result, this synergistic effect increases the chances that the construction of the plenum rated product will fail the peak and/or average low smoke and flammability requirements of the Underwriters Laboratories, Inc. (UL) 910 plenum flame test. In addition, the aforementioned synergistic effect increases the chances that the construction of cables with a limited smoke design such as, for example, found in many non-plenum cables, will fail the limited smoke requirements of the UL 1685 fire-propagation and smoke release tests. The requirements of each test are briefly described below.

The UL 910 plenum flame test criteria are as follows. First, the flame spread or propagation must be less than or equal to five (5) feet. Second, peak smoke must be less than or equal to 0.50. Third, average smoke must be less than or equal to 0.15. Likewise, the criteria of the UL 1685 (UL Method & CSA FT4 Method) fire-propagation and smoke-release test is as follows. First, the cable damage height (for cables which have been exposed to a flaming ignition source) is to be less than 8 feet, 0 inches (244 cm) for UL 1685 (UL Method) when measured from the bottom of the cable tray and 150 cm or less for UL 1685 (CSA-FT/4 Method) when measured from the lower edge of the burner face. Second, the total smoke released is to be 95 m2 or less for UL1685 (UL Method) 150 m2 or less for UL 1685 (CSA-FT/4 Method). Third, the peak smoke release rate is to be 0.25 m2/s or less for UL1685 (UL Method) and 0.40 m2/s or less for UL 1685 (CSA-FT/4 Method).

Thus, efforts have been made to comply with the requirements of the UL-910 plenum flame test and the UL 1685 limited smoke criteria to eliminate the above-described smoke problems associated with the use of polyester backed shielding tapes. Specifically, the jacket material in plenum rated cables has been changed from a low temperature thermoplastic material to SOLEF which is a polyvinylidene fluoride based copolymer (PVDF) and a trademark of Solvay Chemicals. The low temperature thermoplastic material and the use of SOLEF in the jacket both protect the inside of the cable which can typically be flame or limited smoke resistant. However, the use of SOLEF in the jacket is preferred over the low temperature thermoplastic material as it generally appears to resolve the aforementioned smoke problems. Thus, while the use of SOLEF as a jacket material appears to resolve the smoke problems, its use significantly increases the cost of the cables.

In addition to the above-mentioned polyester backed shielding tapes and SOLEF, there are other materials which are used in cables. One such material is polypropylene which is typically used as an insulator on individual conductors for non-plenum cables. Aside from its use as an insulator, other uses for polypropylene include polypropylene backed shielding tapes in non-plenum applications. Because polypropylene backed shielding tape can take folds, no compromises in the shielding effectiveness in the cable by increasing the chance of shield shorts have been noted.

TEFLON, a fluoropolymer and a trademark of the DuPont Company, is also used as a conductor insulation and/or in cables but has smoke-related problems similar to those described above and has a relatively high cost factor.

Another material often found in cables is polyethylene. However, because polyethylene, like polypropylene, readily ignites, it does not comply with the UL-910 plenum flame test. Thus, polyethylene is most commonly used in non-plenum applications.

To date, the known polyester backed shielding tapes generally do not comply with the requirements of the UL-910 plenum flame test. The use of SOLEF typically generates prohibitively high manufacturing costs. In addition, TEFLON includes limitations similar to those described in relation to SOLEF whereas, polyethylene readily ignites and cannot be used for plenum application. Thus, economic materials which may be used in plenum rated products and, at the same time, which satisfy the low smoke and flammability requirements and the limited smoke requirements of the UL-910 plenum flame test and the UL 1685 respectively, are needed.

SUMMARY OF THE INVENTION

Accordingly, it is an object of the present invention to provide a foil shielded plenum rated cable which complies with the low and limited smoke requirements of the UL-910 plenum flame test and the UL 1685 test and has a cable comprising a cylindrical jacket having an internal wall defining a core, a plurality of insulated conductors in said core, and at least one shield surrounding said conductors and separating said conductors from said cylindrical jacket, said shield having a conductive layer and a low temperature smoke resistant cellulose acetate or polypropylene bonded to said conductive layer.

It is another object of the present invention to provide a foil shielded plenum rated cable which eliminates the synergistic effect between the backing material on the foil shield and the low cost plenum polyvinyl chloride compound found in most plenum cables.

The objectives and advantages of the present invention are achieved by providing a foil shielded plenum rated cable that includes, in part, a core having a transmission medium which preferably consists of copper or tin-copper conductors having an insulating layer thereon of preferably an ethylene-chloro-trifluoroethylene copolymer (E-CTFE) or a fluorinated ethylene-polypropylene (FEP) composition. When the core contains a plurality of twisted-pair insulated conductors, preferably a separate first shield surrounds each twisted pair of insulated conductors and each first shield preferably extends longitudinally within and parallel to the length of the cable. Each of the first shields includes a first layer of aluminum material and a second layer of low temperature smoke resistant thermoplastic cellulose acetate or polypropylene which permits the plenum cable to pass the UL-910 plenum flame test and UL-1685 smoke test. The first and second layers are bonded together with the use of adhesive. A second shield surrounds the first shield and extends longitudinally within and parallel to the length of the cable. The second shield includes a first layer of aluminum and a second layer of the preferred cellulose acetate or polypropylene. Similarly to the first shield, the first and second layers are bonded together.

A drain wire is located longitudinally within the cable and parallel to the conductors and provides a means for draining leakage generated from the current. Preferably, the drain wires are in contact with the aluminum layer of the shield. A thermoplastic jacket encloses the drain wire and longitudinally surrounds the second shield. The jacket is preferably a flame retardant low smoke polyvinyl chloride composition.

In another embodiment, the cable includes only a single shielding tape which surrounds the core and preferably extends longitudinally within and parallel to the length of the cable. The single shielding tape includes a first layer of aluminum material and a second layer of the low temperature smoke resistant cellulose acetate or polypropylene. The core contains a plurality of twisted, twisted-pair or non-twisted insulated conductors.

In still another embodiment, the cable includes only a plurality of first shielding tapes which surround each twisted-pair of insulated conductors in the core and each preferably extends longitudinally within and parallel to the length of the cable. The first shielding tapes have a first layer of aluminum material and a second layer of the low temperature smoke resistant thermoplastic composition.

The low temperature smoke resistant thermoplastic non-fluorinated composition backed shielding tape in either of the aforementioned embodiments may be folded without damage to its structural integrity.

Thus, the invention provides a plenum rated cable that complies with the low smoke, limited smoke, and flammability requirements of the UL-910 plenum flame test and the UL 1685 test. The inventive cable accomplishes this by preferably including at least one cellulose acetate or polypropylene backed shielding tape. The structural integrity of the cellulose compound backed shielding tape is such that it allows for the tape to be folded without compromising its shielding effectiveness.

The above, as well as other objects and advantages of the invention, will become apparent from the following detailed description of the preferred embodiments, reference being made to the accompanying drawings.

DETAILED DESCRIPTION OF THE INVENTION

Figure 1:
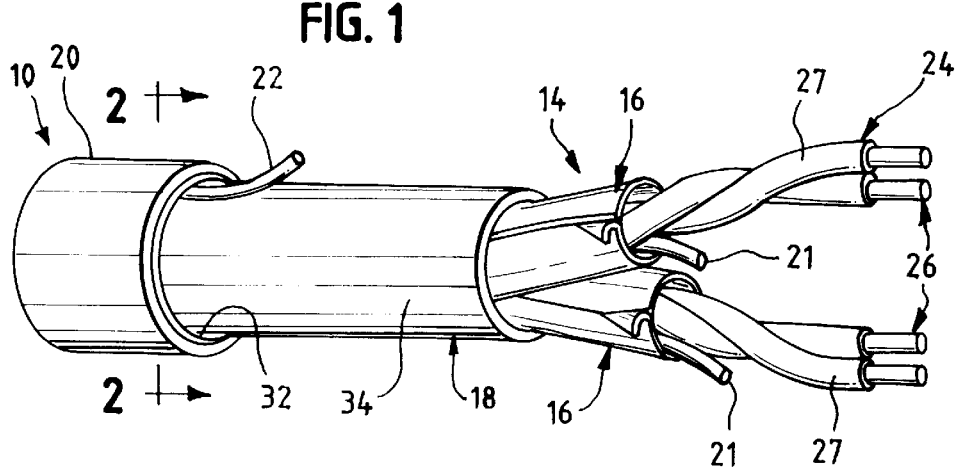
FIG. 1 is a perspective view of the inventive cable having several shields.
Figure 2:
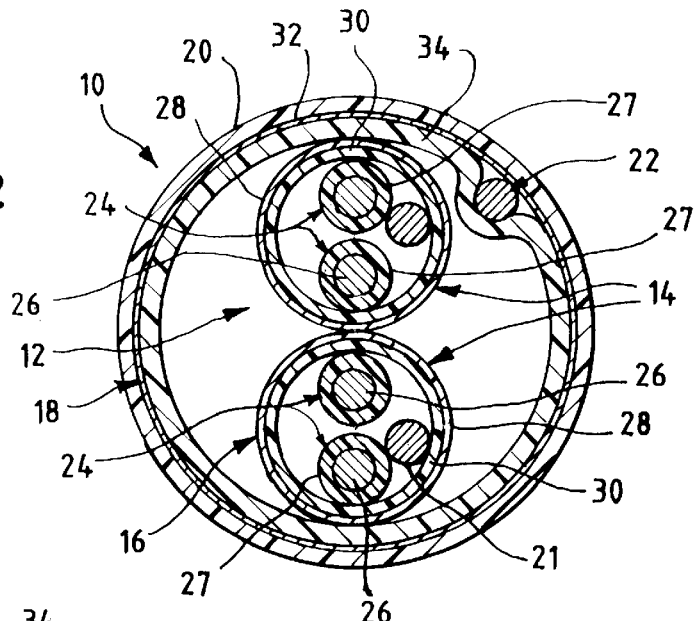
FIG. 2 is a cross-sectional view of the cable, taken along lines 2—2 of FIG. 1.

Generally referring first to FIGS. 1 and 2, there is shown a plenum rated cable generally denoted by the numeral 10, that includes a core 12 with a transmission medium 14 of a plurality of twisted-pair cables 24, a plurality of first shields 16 6r surrounding each twisted-pair cable, a second shield 18 or surrounding the first shields, and a thermoplastic jacket 20. A drain or ground wire 21 is located between each first shield and the respective twisted-pair cable and another drain or ground wire 22 is located between the second shield 18 and the jacket 20 of the cable.

Preferably, the transmission medium 14 consists of several twisted pairs of insulated metallic conductors 24 (FIGS. 1–3, 5 and 6) each of which are formed by twisting together two insulated conductors with a mechanical twisting cabler (not shown). Each of the metallic conductors 26 are generally made of solid or stranded metallic conducting materials, i.e., copper or tin-coated copper, and are covered with an insulating material 27 prior to the twisting process. The insulating material is preferably ethylene-chlorotrifluoroethylene copolymer (E-CTFE) material such as sold by Ausimont under the trademark of Halar or a fluorinated ethylene-propylene copolymer such as that sold under the DuPont trademark TEFLON-FEP.

In cable 10, FIGS. 1 and 2, a separate first shield 16 surrounds each twisted-pair conductors 24 and extends longitudinally within and parallel to the length of the cable. Each first shield 16 comprises a first layer 28 of aluminum material and a second layer 30 of a low temperature smoke resistant thermoplastic material. The term "low temperature" covers thermoplastics having a melting point of between about 100° C. and about 200° C. The terms "smoke resistant" and "limited smoke" cover a material which will permit a cable to pass the requirements for the UL 910, the UL 1685 test, respectively. A preferred material is a cellulose material and preferably a cellulose acetate. Alternatively, polypropylene is used. The cellulose acetate layer or the polypropylene layer is bonded to aluminum foil using an appropriate bonding material such as ethylene acrylic acetate.

The second shield 18 surrounds the core 12 and all of the first shields 16 and extends longitudinally within and parallel to the length of the cable. The second shield 18 includes a first outside layer 32 of aluminum and a second inner layer 34 of cellulose acetate or polypropylene. The layers in the second shield are bonded together using an appropriate bonding material such as ethylene acrylic acetate. The inner cellulose acetate or polypropylene layer 34 preferably faces the first shields.

Figure 3:
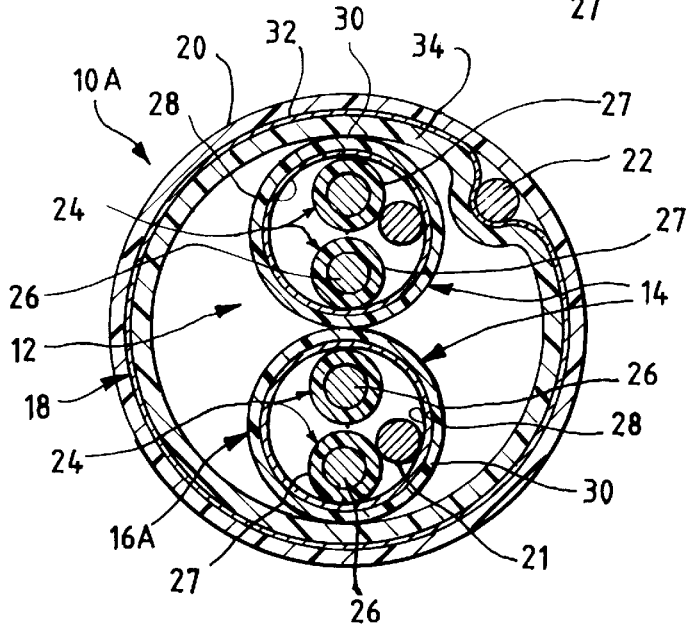
FIG. 3 is a cross-sectional showing another configuration of the shields.

In FIG. 3, there is shown a cable 10A which is identical to cable 10 except shields 16A have the aluminum layer 28 on the inside facing the twisted-pair conductors 24 and the cellulose acetate or polypropylene layer 30 on the outside facing the jacket 20. The drain wire 22 is between the aluminum layer 32 and the jacket 20. Also, drain wires 21 have full contact with the aluminum layer 28.

In both first and second shields, 16, 16A and 18, respectively, the aluminum layers 28, 32 are each from about 0.00030 inches to about 0.001 inches in thickness and preferably each is 0.0007 inches in thickness. Likewise, the cellulose acetate or polypropylene layer 30 in first shield 16 and 16A and second layer 34 in second shield 18 are each is from about 0.0005 inches to about 0.0030 inches in thickness and preferably is 0.0015 inches in thickness.

Figure 4:
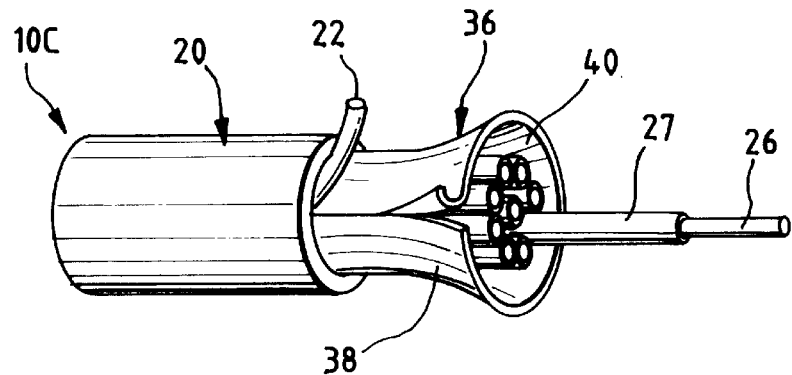
FIG. 4 is a perspective view of the inventive cable having one shield.

In FIG. 4, the cable 10C has an overall single shielding tape 36 which surrounds the core and extends longitudinally within and parallel to the length of the cable. Single shielding tape 36 includes a first layer 38 of aluminum material and a second layer 40 of low temperature smoke resistant cellulose acetate or polypropylene. First and second layers 38 and 40, respectively, are also bonded together. The drain wire contacts the aluminum layer 38. In this embodiment the conductors are not twisted together but instead are arranged within the cable in parallel relation to one another. Thermoplastic jacket 20 encloses and longitudinally surrounds the single shield 36.

Figure 5:
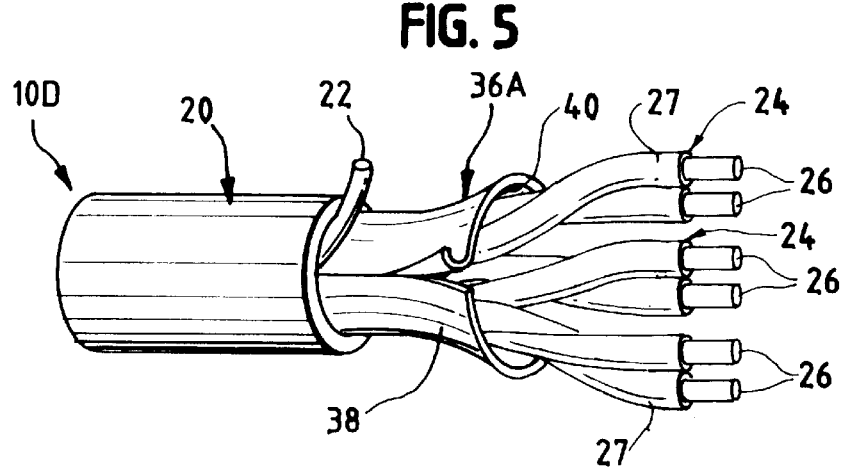
FIG. 5 is another perspective view of the inventive cable having one shield.

FIG. 5 shows a similar cable 10D having a plurality of twisted pair conductors 35 with a single shielding tape 36A surrounding all of the twisted-pair conductors 24. In this embodiment the first aluminum layer 38 faces the jacket 20 and the cellulose acetate or polypropylene second layer 40 faces the twisted-pair conductors 24. The drain wire 22 is in contact with the aluminum layer 38. Thermoplastic jacket 20 encloses and longitudinally surrounds the single shield 36.

Figure 6:
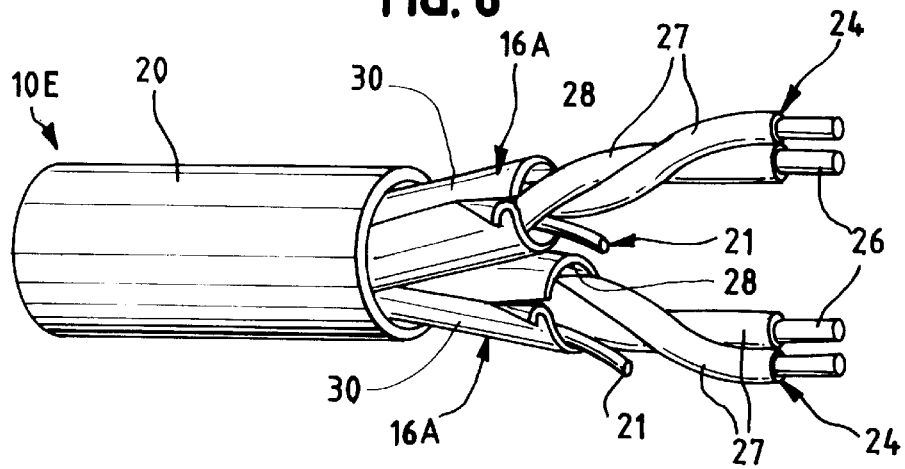
FIG. 6 is a perspective view of another inventive cable having several shields.

In FIG. 6, a cable 10E has a plurality of shielding tapes 16 which surround each twisted-pair conductor 24 in the core and each preferably extends longitudinally within and parallel to the length of the cable. The shielding tapes 16A have a first layer of aluminum material 28 facing the twist-pair conductors and a second layer 30 of the low temperature smoke resistant thermoplastic composition i.e. cellulose acetate or polypropylene facing the jacket 20 and a plurality of drain or ground wires 21 in contact with the aluminum layers.

In the above embodiments, conductors 26 are covered with about 5 to about 12 mils of insulation with the preferred being about 7 mils of FEP insulation or about 10 mils of Halar insulation.

The dimensions of the aluminum layer is 0.00030 inches to about 0.001 inches in thickness and preferably is 0.0007 inches in thickness. The cellulose acetate or polypropylene layer dimensions are from about 0.0005 inches to about 0.0030 inches in thickness and preferably is 0.0015 inches in thickness.

The thermoplastic jacket 20 is preferably made of a polyvinyl chloride composition and is from about 0.010 inches to about 0.020 inches in thickness and preferably 0.015 inches in thickness. Alternatively, thermoplastic jacket 20 may be made of a low cost flame retarded thermoplastic material such as sold under the trademark of FLAMEARREST which is owned by Belden Wire and Cable Company.

Drain wires 21 and 22 are located longitudinally within the cable in the aforementioned embodiments and is parallel to the conductors. Drain wires 21 are located with respect to each shield 16 and 16A and drain wire 22 is located with respect to the shields 18, 36 and 36A. In all embodiments, drain wires 21 and 22 provide means for draining leakage within the cable generated from the current and thus are preferably longitudinally throughout their length in contact with the aluminum layer of the respective shields.

The following Examples illustrate the effectiveness of the inventive shielding tape.

EXAMPLE 1

Three different types of foil shields were subjected to a modified Arapahoe smoke chamber to evaluate the degree of smoke density left on a piece of filter paper. Specifically, the smoke density was observed for foil shields backed with Scotch tape, polyester, and polypropylene. The Scotch tape backed samples yielded the lowest degree of smoke, while the polypropylene backed samples were the next best and generated limited smoke. The Scotch tape backed samples were subsequently evaluated through the use of a Fourier Transform Infrared Spectrometer (FTIR) and found to primarily contain cellulose based material. The absorbence value of the cellulose based material (cellulose acetate) of the Scotch tape substrate showed a marked increase as the wavenumber value was in the range of 1000 to 1800.

EXAMPLE 2

Next, shielding tapes with cellulose acetate, polypropylene, and polyester backings were evaluated for flame spread, peak smoke, and average smoke values, and then further to determine a passing or failing grade under the UL-910 plenum flame test requirements, Table 1, and described in further detail below.

The polyester backed shielding tapes were evaluated for both overall and individual shielded cables. In the overall shielded cables, 0.0005 inches of polyester was used on the tapes whereas, 0.0010 inches of polyester was used on the individually shielded tapes. Moreover, both FEP and Halar insulation was used in the overall shielded tapes, while only Halar insulation was used in the individually shielded tapes. Both the overall and the individually shielded tapes included 0.00035 inches of aluminum foil and outer polyvinyl jackets of 0.015 inches. As shown in Table 1 below, the test results indicated that the polyester backed shielding tapes in both the overall and the individually shielded cables did not pass the UL-910 plenum flame test.

The polypropylene backed shielding tapes were evaluated for individual shields only and showed a passing grade for the UL-910 plenum flame test. However, as Table 1 indicates, the peak smoke values for polypropylene were higher than those for the cellulose backed shielding tapes and, therefore, is optimal for application in products requiring limited smoke generation as required in UL-910 or UL-1685.

The cellulose backed shielding tapes were evaluated for both overall and individually shielded cables. In each instance, the cables included 0.0010 inches of cellulose material on the tape. As Table 1 indicates, the cellulose backed shielding tapes always passed the UL-910 plenum flame test and included the lowest values for the flame spread, peak smoke, and average smoke. Thus, the presence of cellulose acetate in the cables in each instance resulted in a considerable reduction in smoke generation and included the following data: a flame spread value of from about 0.5 feet to about 1.5 feet (maximum average allowed is 5 feet); a peak smoke value of from about 0.22 to about 0.34 (maximum allowed peak value is 0.50); and an average smoke value of from about 0.10 to about 0.15 (maximum average allowed is 0.15).

TABLE 1

INSULATION SHIELD

| Pairs in Cable | Insulation | Type | FOIL Backing | Tape | FLM Jacket | PEAK SPRD | AVG. SMK | AVG. SMK | P/F |
|---|---|---|---|---|---|---|---|---|---|
| 12.5 | FEP | overall | polyes. | .00035" | .015" | 4.0' | .35 | .16 | F |
| 12.5 | FEP | overall | cellul. | .00035" | .015' | 1.5' | .32 | .12 | P |
| 12.5 |  |  |  |  |  | 1.5' | .22 | .10 | P |
| 6 | Halar | overall | polyes. | .00035" | .015' | 1.5' | .49 | .21 | F |
| 6 | Halar | indiv. | polyes. | .00035" | .015' | 1.0' | .67 | .25 | F |
| 6 | Halar | indiv. | polyes. | .00035" | .015' | 2.5' | .64 | .26 | F |
| 6 | Halar | indiv. | cellul. | .00035" | .015' | 1.5' | .27 | .12 | P |
|  |  |  |  |  |  | 1.5' | .30 | .12 | P |
| 6 | Halar | indiv. | cellul. | .00035" | .015' | 0.5' | .34 | .14 | P |
|  |  |  |  |  |  | 0.5' | .37 | .15 | P |
| 6 | Halar | indiv. | polypro. | .00035" | .015' | 1.5' | .44 | .12 | P |
|  |  |  |  |  |  | 1.5' | .38 | .15 | P |

Therefore, it should be recognized that, while the invention has been described in relation to a preferred embodiment thereof, those skilled in the art may develop a wide variation of structural details without departing from the principles of the invention. Accordingly, the appended claims are to be construed to cover all equivalents falling within the true scope and spirit of the invention.

The invention claimed is:

1. A plenum rated cable comprising:
a cylindrical jacket having an internal wall defining a core,
a plurality of insulated conductors in said core, and
at least one shield surrounding said conductors and separating said conductors from said cylindrical jacket, said shield having a first layer of an aluminum conductive material and a second layer of low temperature smoke resistant cellulose or polypropylene and
said first and second layers being bonded together.

2. The cable of claim 1 wherein said second layer is cellulose acetate.

3. The cable of claim 2 wherein said conductors are a plurality of twisted-pair conductors wherein the insulation on at least one of said twisted-pair conductors is selected from ethylene-chloro-trifluoroethylene copolymer and fluorinated ethylene-polypropylene.

4. The cable of claim 3 wherein said insulation is from about 5 mils to about 12 mils in thickness.

5. The cable of claim 4 wherein said jacket is a polyvinyl chloride composition.

6. The cable of claim 2 wherein said insulated conductors are a plurality of twisted-pair conductors wherein the insulation on at least one of said twisted-pair conductors is selected from ethylene-chloro-trifluoroethylene copolymer and fluorinated ethylene-polypropylene.

7. The cable of claim 6 wherein said jacket is a polyvinyl chloride composition.

8. The cable of claim 2 wherein said conductors are selected from copper, tin-copper and optical fiber.

9. The cable of claim 1 wherein there are a plurality of twisted-pair conductors with at least one twisted-pair conductor being surrounded by a first shield and all of said insulated conductors including said at least one twisted-pair being surrounded by a second shield, each of said first and second shields having the first layer of aluminum conductive material bonded to the second layer of low temperature smoke resistant cellulose or polypropylene.

10. The cable of claim 9 wherein said second layer is cellulose acetate.

11. The cable of claim 10 wherein said insulated conductors are a plurality of twisted-pair conductors wherein the insulation on at least one of said twisted-pair conductors is selected from ethylene-chloro-trifluoroethylene copolymer and fluorinated ethylene-polypropylene.

12. The cable of claim 11 wherein said jacket is a polyvinyl chloride composition.

13. The cable of claim 9 wherein said second layer is polypropylene, said jacket is a polyvinyl chloride composition and said insulated conductors are a plurality of twisted-pair conductors wherein the insulation on at least one of said twisted-pair conductors is selected from ethylene-chloro tetrafluoroethylene copolymer and fluorinated ethylene-polypropylene.

14. The cable of claim 1 wherein said second layer is cellulose acetate.

15. The cable of claim 1 wherein said second layer is polypropylene, said jacket is a polyvinyl chloride composition and said insulated conductors are a plurality of twisted-pair conductors wherein the insulation on at least one of said twisted-pair conductors is selected from ethylene-chloro-trifluoroethylene copolymer and fluorinated ethylene-polypropylene.

16. The cable of claim 1 wherein said at least one shield is a plurality of conductor shields, each conductor shield surrounding at least one insulated conductor, wherein all of said plurality of insulated conductors are surrounded by said plurality of conductor shields.

17. The cable of claim 16 wherein a second shield surrounds all of said plurality of conductor shields and said second shield has a first layer of aluminum conductive material and a second layer of low temperature smoke resistant cellulose or low temperature smoke resistant polypropylene and said first and second layers are bonded together.

18. The cable of claim 17 wherein the aluminum layer of said plurality of conductor shields faces said jacket and the aluminum layer of said second shield faces said jacket.

19. The cable of claim 17 wherein the aluminum layer of each of said plurality of conductor shields faces a respective conductor and the aluminum layer of said second shield faces said jacket.

20. The cable of claim 17 wherein said thermoplastic jacket has a thickness of about 0.010 inches to about 0.020 inches, the aluminum layer on said plurality of conductor shields and said second shield is from about 0.00030 inches to about 0.001 inches and the second layer of cellulose acetate in each of said plurality of conductor shields and the second layer of cellulose acetate or polypropylene material in said second shield is from about 0.0005 inches to about 0.0030 inches.

21. The cable of claim 1 wherein said at least one shield is a plurality of conductor shields, each conductor shield surrounding at least one pair of insulated conductors, wherein all of said plurality of insulated conductors are surrounded by said plurality of conductor shields.

22. The cable of claim 1 wherein said at least one shield is an overall shield surrounding all of said plurality of insulated conductors.

23. A UL910 plenum and UL 1685 rated cable comprising:
   a cylindrical jacket having an internal wall defining a core,
   a plurality of insulated conductors in said core, and
   at least one shield surrounding said conductors and separating said conductors from said cylindrical jacket, said shield having a first layer of an aluminum conductive material and a second layer of low temperature smoke resistant cellulose or polypropylene and said first and second layers being bonded together.

24. The cable of claim 23 wherein a second shield surrounds all of said plurality of conductor shields and said second shield has a first layer of aluminum conductive material and a second layer of low temperature smoke resistant cellulose or low temperature smoke resistant polypropylene and said first and second layers are bonded together.

25. The cable of claim 24 wherein the aluminum layer of said plurality of conductor shields faces said jacket and the aluminum layer of said second shield faces said jacket.

26. The cable of claim 24 wherein the aluminum layer of each of said plurality of conductor shields faces a respective conductor and shields faces said jacket and the aluminum layer of said second shield faces said jacket.

27. The cable of claim 24 wherein said thermoplastic jacket has a thickness of about 0.010 inches to about 0.020 inches, the aluminum layer on said plurality of conductor shields and said second shield is from about 0.00030 inches to about 0.001 inches and the second layer of cellulose acetate in each of said plurality of conductor shields and the second layer of cellulose acetate or polypropylene material in said second shield is from about 0.0005 inches to about 0.0030 inches.

28. The cable of claim 23 wherein said at least one shield is a plurality of conductor shields, each conductor shield surrounding at least one insulated conductor, wherein all of said plurality of insulated conductors are surrounded by said plurality of conductor shields.

29. The cable of claim 23 wherein said at least one shield is a plurality of conductor shields, each conductor shield surrounding at least one pair of insulated conductors, wherein all of said plurality of insulated conductors are surrounded by said plurality of conductor shields.

30. The cable of claim 23 wherein said at least one shield is an overall shield surrounding all of said plurality of insulated conductors.

31. An electrical or communication cable shielding tape comprising a first layer of an aluminum conductive material,
   a second layer of low temperature smoke resistant material selected from the group consisting of cellulose and polypropylene, and
   said first and second layers being bonded together.

32. The shielding tape of claim 31 wherein said second layer is cellulose acetate.

33. The shielding tape of claim 32 wherein said first layer is bonded to said second layer with ethylene acrylic acetate.

34. The shielding tape of claim 33 wherein said tape is a UL 910 and UL 1685 plenum rated cable shielding tape.

* * * * *